United States Patent [19]

Houston et al.

[11] 4,022,431
[45] May 10, 1977

[54] METHODS OF STRINGING BUNDLE CONDUCTORS

[75] Inventors: Herbert J. Houston, Oakville; Kenneth D. Bolt, Burlington, both of Canada; William H. Chadwick, Jr., Rossville, Ga.; Tracy R. Hall, East Ridge, Tenn.

[73] Assignees: Slater Steel Industries Limited, Canada; Sherman & Reilly, Inc., Chattanooga, Tenn.

[22] Filed: June 18, 1976

[21] Appl. No.: 697,482

[52] U.S. Cl. .................. 254/134.3 PA; 254/193
[51] Int. Cl.² .................................. E21C 29/16
[58] Field of Search ........... 254/134.3 PA, 134.3 R, 254/192–196

[56] References Cited
UNITED STATES PATENTS 2,374,048  4/1945  Staheli ............... 254/134.3 PA
3,501,129  3/1970  Simmonds ........... 254/134.3 PA Primary Examiner—Al Lawrence Smith
Assistant Examiner—Robert C. Watson
Attorney, Agent, or Firm—Fleit & Jacobson

[57] ABSTRACT

A method of stringing a bundle of cables from a suspension bracket suspended from a tower cross arm by insulator strings includes securing a temporary connection along at least a part of one of the strings to provide a temporary suspension connection which enables the string to be uncoupled, so that one of the cables can be passed through the uncoupled string. The string is then recoupled and the temporary connection is removed to allow the conductor to be secured to the suspension bracket. This method enables one or more cables to be secured above the suspension bracket for reducing the voltage gradient across the lowermost insulators of the strings.

14 Claims, 8 Drawing Figures

METHODS OF STRINGING BUNDLE CONDUCTORS

BACKGROUND OF THE INVENTION

1. Field of the Invention

The present invention relates to methods of stringing electrical conductors in bundles from suspension brackets.

2. Description of the Prior Art

In high voltage transmission lines, it is common practice to suspend sub-conductors or cables in a bundle from a tower by means of a suspension assembly comprising a suspension bracket or yoke suspended at the lower ends of insulator strings, which are connected at their upper ends to a cross-arm of the tower.

To provide such a suspension of the cables, the suspension bracket is firstly suspended from the tower by the insulator strings, and a bundle or stringing block is suspended from the suspension bracket, the bundle or stringing block comprising a plurality of rollers or pulleys formed with peripheral grooves for receiving the cables.

In some cases, the bundle block may be supported directly from the tower cross-arm independently of the suspension bracket and insulator strings.

A pulling line is passed through the bundle block, and the bundle of cables is pulled into place using a common pulling board.

The cables are then "sagged" to the correct tension, after which the cables are "clipped in", i.e. transferred from the bundle or stringing block to the suspension bracket, to which they are attached by clamps. The transfer of the cables from the bundle or stringing block to the suspension bracket is effected by temporarily supporting the cables to remove their weight from the bundle or stringing block, the cables usually being supported by cushioned support brackets attached to the cables, and the support brackets being connected to the tower cross-arm, usually by means of a coupling yoke and an adjustable system to permit raising of the cables from the bundle block. The block is then normally removed to enable the cables to be transferred to their final positions in suspension clamps provided on the suspension bracket.

It is also usual to temporarily support at least one of the cables from the suspension bracket before removal of the stringing block in order to tension the insulator strings.

It has been known for some time that the cable suspension should desirably be designed so as to avoid the existence of undesirably high voltage gradients across the individual insulators of the insulator strings by which the suspension bracket is suspended. Devices such as grading rings and shields have been employed in the past in order to make such voltage gradients more uniform and thereby to relieve stress across the insulators situated nearest the suspension bracket, which would otherwise bear disproportionately high fractions of the total line to ground voltage.

Also, it has been proposed to design the suspension bracket to counteract such high voltage gradients by supporting the cables near the lowermost insulators of the strings.

For example, in Canadian Pat. No. 653,027, issued Nov. 27, 1972, inventor Robert G. Baird there is disclosed a suspension bracket for supporting the tension cables, the bracket being constructed so as to support at least one of the cables generally outwardly and approximate the lowermost few of the insulators of insulator strings suspending the bracket.

Also, the U.S. Pat. No. 3,076,863, issued Feb. 5, 1963 to A. D. Lantz et al., there is disclosed an arrangement of conductor cables including a suspension bracket or plate having two arms extending equally and oppositely from the body of the suspension plate in the transverse direction and equally in the direction of the suspension insulators, so that the two top cables are disposed closely adjacent the adjacent one of the suspension insulators.

In addition, in order to keep to a minimum the required height of the towers required for suspending the cables, it is desirable to have the bundle of cables positioned as high as possible with respect to the suspension bracket. This can advantageously be done by clamping one or more of the cables to the top of the suspension bracket, and the aforementioned U.S. Pat. No. 3,076,863 for example, discloses an arrangement in which three cables are clamped to a suspension plate in a triangular array with one of the cables, at the apex of the triangular array, positioned near the top of the suspension bracket and between two strings of insulators disposed in a V-array.

However, this previously proposed arrangement has hitherto presented a problem in that no practical and suitable method has been developed for "clipping in" the uppermost cable during the cable bundle stringing operation.

OBJECT OF THE INVENTION

It is accordingly an object of the present invention to provide a novel and improved method of stringing conductors from a suspension bracket which enables at least one of the cables to be brought into position above the suspension bracket past insulator strings suspending the suspension bracket.

SUMMARY OF THE INVENTION

To that end, in accordance with the present invention, there is provided a method of stringing conductors from a suspension bracket suspended by insulator strings which comprises temporarily suspending the conductors near the suspension bracket, providing a temporary connection along at least a portion of one of the insulator strings, uncoupling such insulator string portion, so that the suspension bracket is temporarily suspended through the temporary connection, passing at least one of the conductors through the uncoupled insulator string, recoupling the latter, removing the temporary connection, and securing said one or more conductors to the suspension bracket.

To facilitate the uncoupling of the insulator string, the upper and lower ends of the temporary connection are preferably displaced towards one another to release tension in the insulator string therebetween prior to the uncoupling of the insulator string.

BRIEF DESCRIPTION OF THE DRAWINGS

The invention will be more readily understood from the following description of a preferred embodiment thereof given, by way of example, with reference to the accompanying drawings, in which.

DESCRIPTION OF THE PREFERRED EMBODIMENT

Figure 1:
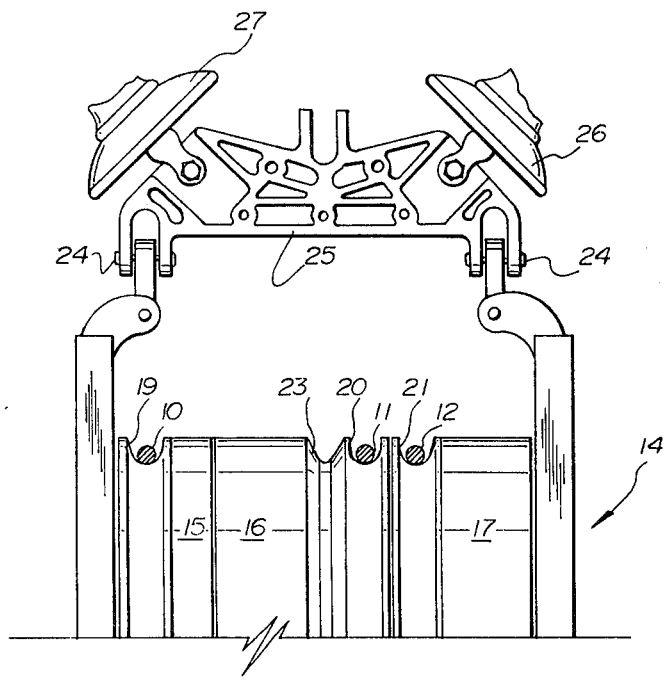
FIG. 1 shows a broken-away view of parts of a cable bundle suspension assembly with an attached bundle block during an initial step in a cable stringing operation.

Referring firstly to FIG. 1, there are shown in this Figure three cables 10, 11 and 12 which have been pulled, in a manner which is conventional and well known in the art and which is therefore not described herein, through a bundle or stringing block indicated generally by reference numeral 14.

The bundle block 14 is provided with three freely rotatable pulleys or rollers 15, 16 and 17. The cables 10, 11 and 12 are received in peripheral grooves 19, 20 and 21, respectively, formed in the rollers 15, 16 and 17, respectively.

The peripheral grooves 19, 20 and 21 are lined, in conventional manner, with a relatively soft metal, e.g. aluminum, to avoid damage to the cables 10, 11 and 12.

The roller 16 is also provided with a peripheral groove 23 for receiving a steel pulling cable (not shown), which is employed in conventional manner for pulling the cables 10, 11 and 12 through the block 14, the groove 23 being lined with a harder metal e.g. steel, to reduce wear thereon by the pulling cable.

The bundle block 14 is connected by connecting pins 24 in suspension from and beneath a cable suspension bracket or yoke 25 which, in turn, is suspended from a cross-arm of a tower (not shown) by strings of insulators arranged in V-array, of which only the lowermost insulators 26 and 27 are, for convenience of illustration, shown in FIG. 1.

Prior to clamping or clipping in of the cables 10, 11 and 12 to the suspension bracket 25, the cables 10, 11 and 12 are raised from their rollers 15, 16 and 17 and temporarily supported, free of but close to the stringing block 14, in temporary support hooks 28, 29 and 30.

The support hook 28 is suspended from the suspension bracket 25 in order to load the latter, by the weight of the cable 10, and thus to maintain the insulator strings in a taut condition after the cales 10, 11 and 12 are lifted from the stringing block 14.

Figure 2:
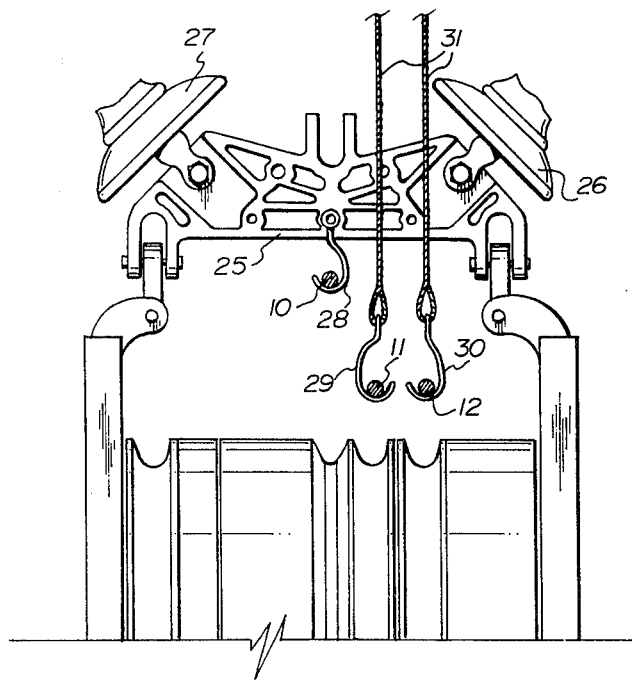
FIG. 2 shows a view corresponding to FIG. 1 during a subsequent step in the cable stringing operation.

To maintain the stringing block 14 in balance during movement of the cables from the positions in which they are shown in FIG. 1 to those in which they are shown in FIG. 2, the cables 10 and 12 are preferably firstly lifted from their respective rollers 15 and 17, while the cable 11 remains in its groove 20 which, as can be seen from FIG. 1, is close to the centre of the stringing block 14, in order to load the insulator strings. The cable 10 is then supported by the hook 28 from the suspension bracket 25, after which the cable 11 is lifted from its roller 16 by the suspension hook 29.

The suspension hooks 29 and 30 are suspended by lines 31 which, in conventional manner, run over pulleys (not shown) supported by the tower.

With the three cables supported as shown in FIG. 2, the bundle block 14 is removed from the suspension bracket 25 by removal of the connecting pins 24, the right-hand insulator string is uncoupled, as described in greater detail hereinafter, and the cable 12 is then raised upwardly through the right-hand insulator string, as indicated diagrammatically by arrows in FIG. 3.

Figure 3:
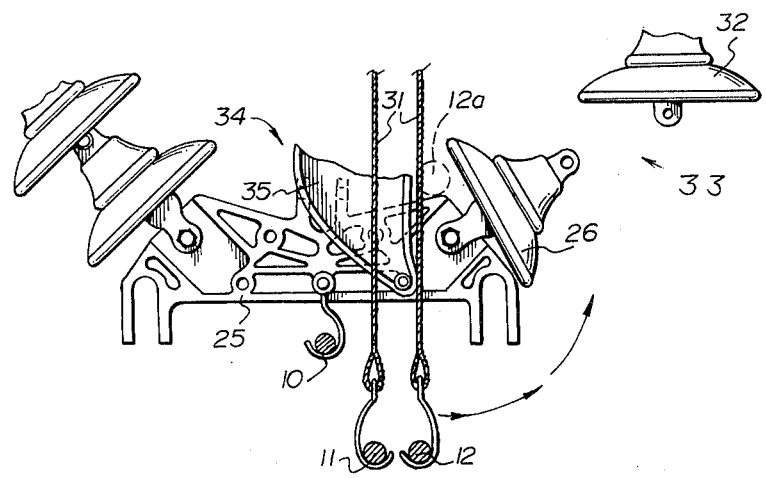
FIG. 3 shows a view of parts of the cable suspension assembly, with the bundle block removed, during a later step in the stringing operation.

To enable this to be done, the insulator 26 is uncoupled from the adjacent insulator, indicated by reference numeral 32 in FIG. 3, of its insulator string, and during such uncoupling the suspension bracket 25 is temporarily connected to that insulator string, at a position above the insulator 32, by means of a temporary connecting tool 34, of which only part of a lower portion or frame 35 is shown in broken-away condition in FIG. 3, and which is also described in greater detail hereinafter.

With the insulators 26 and 32 uncoupled to form a gap, indicated by reference numeral 33 in FIG. 3, the cable 12 is raised, through the gap 33, by means of the suspension hook 30 and the respective line 31 and is temporarily held above the top of the suspension bracket 25, between the temporary connecting tool 34 and the insulator 26, in the position illustrated in broken lines in FIG. 3 and indicated by reference numeral 12a by the support hook 30.

Figure 4:
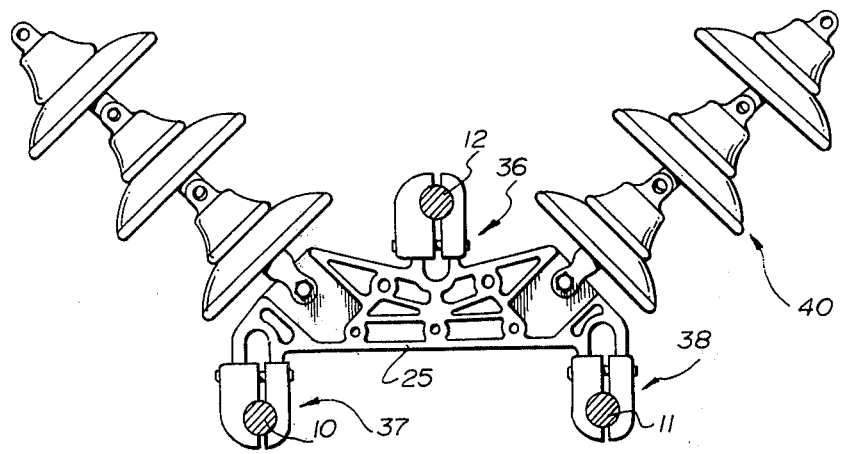
FIG. 4 shows a view of the suspension assembly after the stringing operation.

The insulators 26 and 32 are then recoupled, and the temporary connecting tool 34 is released and removed from the suspension bracket 25 and the right-hand insulator string, so that the cable 12 can be moved upwards and secured, by means of a cable clamp indicated generally by reference numeral 36, in the position in which it is shown in FIG. 4.

The cables 10 and 11 both are likewise secured or clipped in to the underside of the suspension bracket 25 by respective cable clamps 37 and 38, as shown in FIG. 4, which shows the final clipped in cable bundle and associated suspension, the right-hand insulator string being indicated in FIG. 4 by reference numeral 40.

The temporary connector tool 34, which is the subject of copendng U.S. Pat. application Ser. No. 690,918, filed May 28, 1976, by William H. Chadwick Jr., and its manner of operation will now be described in greater detail with reference to FIGS. 5 to 8.

Figure 5:
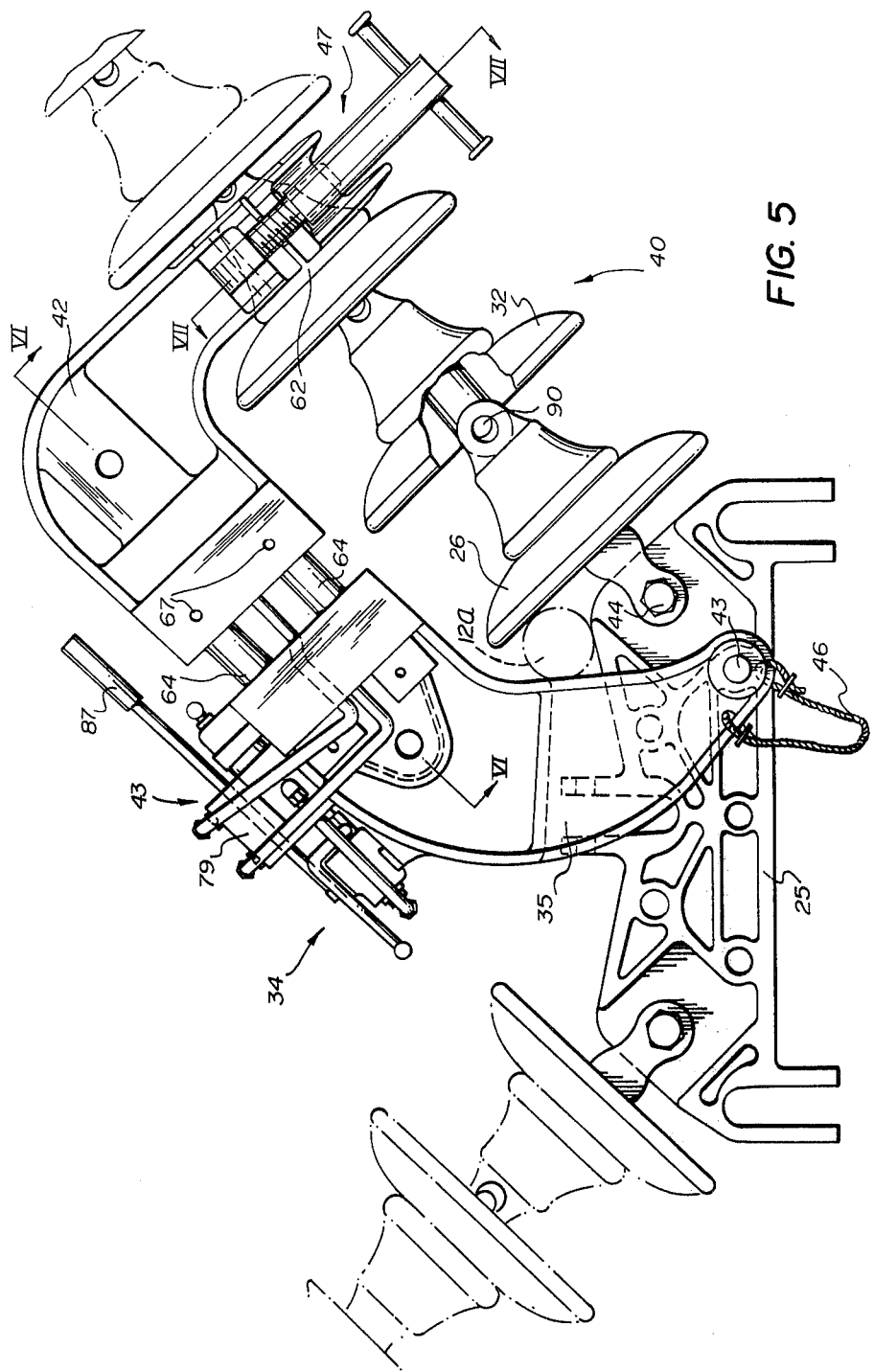
FIG. 5 shows a side view of a temporary connector tool attached to the suspension assembly during the stringing operation.
Figure 6:
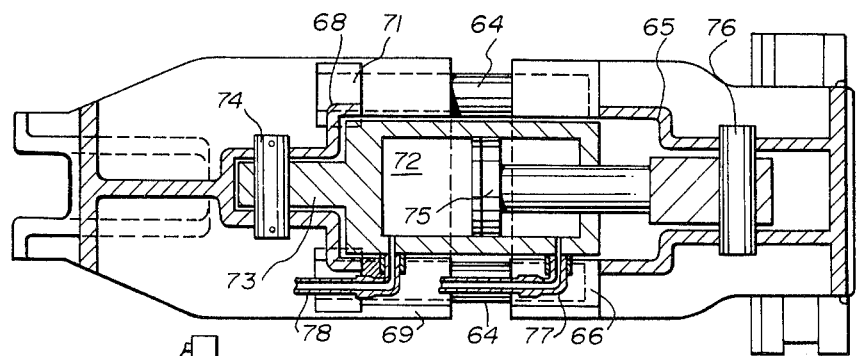
FIG. 6 shows a view taken in section along the line VI—VI of FIG. 5.
Figure 7:
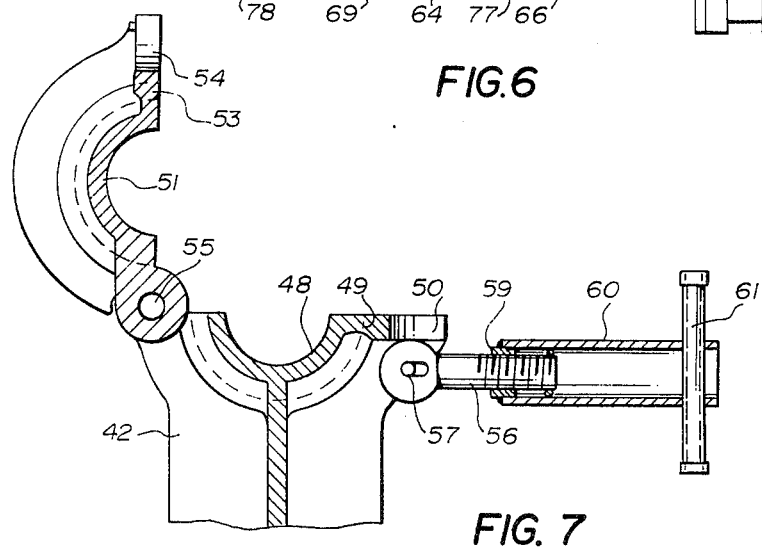
FIG. 7 shows a view taken in section along the line VII—VII of FIG. 5.
Figure 8:
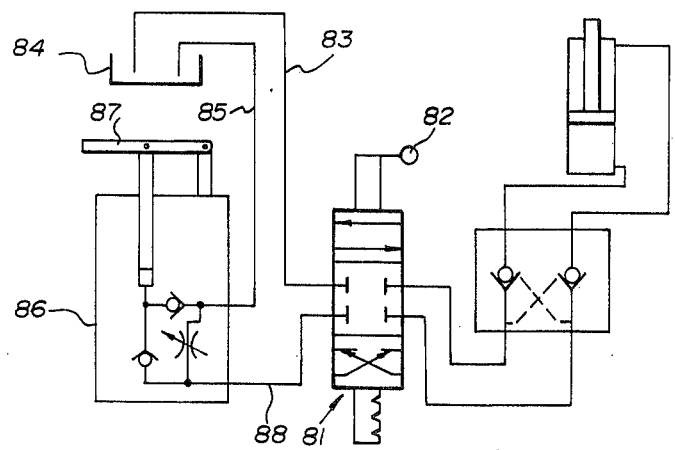
FIG. 8 shows a diagrammatic view of a hydraulic circuit provided for operating the temporary connector tool shown in FIG. 5.

As can be seen from FIG. 5, the temporary connecting tool 34 is of generally C-shaped configuration and comprises an upper portion or frame 42, the lower portion or frame 35, and means indicated generally by reference numeral 43 for interconnecting the lower end of the upper frame 42 and the upper end of the lower frame 35 and operable to effect longitudinal movement of the frames 35 and 42 relative to each other. The lower end portion of the lower frame 35 is bifurcated to enable it to straddle the suspension bracket or yoke plate 25 and is apertured to receive a flanged ball-lock pin 43, which may be inserted through an aperture provided in the suspension bracket 25 in alignment with a socket clevis bolt 44 and with the longitudinal axis of the right-hand insulator string 40. The bolt 44 serves to connect the lowermost insulator 26 of the insulator string 40 to the suspension bracket 25, and the flange of the pin 43 is loosely connected to the lower frame 35 by a keeper cord or lanyard 46.

The upper end of the upper frame 42 is provided with clamping means, indicated generally by reference numeral 47, which comprises a first semi-circular jaw 48 formed at the end of the frame and having a lateral extension 49 with a first slot 50 in its outer end, and a second semi-circular jaw 51 shaped complementally to jaw 52, with a lateral extension 53 having a second slot 54 in one end aligned with the first slot 50 and pivotally mounted at its other end at 55 on the upper frame 42. The clamping means 47 includes a bolt 56 pivotally mounted at 57 on the frame 42 for movement into and out of the slots 50 and 54, with its free end threaded to receive a nut 59 for engagement with the lateral extension 53, and a sleeve 60 having its inner end secured to the nut 59 and provided at its outer end with a radially extending handle 61.

The jaws 48 and 51 are adapted to embrace a metal cap 62 of one of the insulators in the string 40, after which the lower frame is secured to the suspension bracket 25 by the pin 43. As can also be seen from FIG. 5, the lower portion of the upper frame 42 and the upper portion of the lower frame 35 are aligned with each other longitudinally of the temporary connection device 34, and their outer ends are offset therefrom so that the centres of the jaws 48 and 51 and the securing means or pin 43 define a longitudinal axis which coincides with that of the insulator string 40.

The means 43 interconnecting the frames 35 and 42 includes four guide pins 64 which are parallel to that longitudinal axis. The lower part of the upper frame 42 defines a hollow housing 65 with an end portion 66 having suitable apertures for receiving the upper ends of the guide pins 64 which are secured thereto by pins 67. The upper part of the lower frame 35 similarly defines a hollow housing 68 with an end portion 69 having apertures extending therethrough slidably receiving the guide pins 64. Stop rings 71 are mounted on and suitably secured to the lower ends of guide pins 64 to limit downward sliding of the lower frame 35 on the pins 64.

The interconnecting means 43, as previously noted, also effects longitudinal movement of the frames 42 and 35 relative to each other. To this end it includes an hydraulic cylinder 72 (FIG. 6) having a connecting member 73 secured to its lower end, as by welding, which is disposed within the housing 68 and is connected thereto by a pin 74. A piston 75 mounted in the cylinder 72 has its rod extending upwardly in the housing 65 and connected thereto by a pin 76. The upper end of the cylinder 72 is connected in well-known manner to an hydraulic line or conduit 77 and the lower end of the cylinder similarly is connected to a line 78. A double pilot operated check valve 79 (FIG. 5) is interposed in the lines 77 and 78, and beyond the valve 79 those lines are connected to a four-way manual three-position detent control valve 81 which is controlled by a handle 82. The interconnection of these hydraulic mechanisms is illustrated schematically in FIG. 8, which also shows a conduit 83 connecting the valve 81 to a reservoir or source of fluid 84 and an inlet conduit 85 connecting the reservoir 84 to a hand pump 86. The latter is operably by a handle 87 and is connected to the control valve 81 by an outlet conduit 88. The hand pump 86 and reservoir 84 preferably are formed as an integral unit.

The valve 79 prevents the cylinder 72 from bleeding down should there be a hydraulic failure in the pump 86 or the control valve 81. This also makes it necessary to power the cylinder 72 down, instead of allowing it to bleed down by gravity or be forced down by an external load. Such operation is important here because the insulators will not withstand very high shock or impact loads. It will be readily apparent from FIG. 8 that the control valve 81 may be operated by its handle 82 to select the power-up or power-down modes of the cylinder 72 and its piston 75 in response to operation of the pump 86 by means of its handle 87.

As previously noted, the above-described temporary connector device is employed when it is desired to move the cable 12 upwardly through the insulator string 40. To enable such movement of the cable 12, the lineman will interconnect a portion of the insulator string 40 and the suspension bracket 25, as shown in FIG. 5. To accomplish this, the jaws 48 and 51 are secured around the metal cap 62 of one of the insulators of the string 40 by means of the nut 59 and the bolt 56, and the lower frame 35 then is mounted upon the suspension bracket 25 and connected by the pin 43 thereto.

The frame 42 is then displaced downwardly relative to the lower frame 35 in the direction of the axis of the insulator string 40 by first adjusting the valve handle 81 to set the control valve in position for a power-up mode, and then actuating the pump handle 87. This will force fluid into the upper portion of the cylinder 72 through the line 77 to move the piston 75 downwardly.

Only a relatively small degree of relative movement of the frames is required, i.e. just enough travel to relieve tension in the insulator string 40 to facilitate removal of the socket clevis bolt 44 or, as shown in FIG. 5, an insulator connecting pin 90 between the insulators 26 and 32. This provides clearance for movement of the cable 12 upwardly to the dotted line position illustrated at 12a in FIGS. 3 and 5.

Upon completion of the movement of the conductor through the insulator string 40, i.e. from one side of it to the other, the insulator string is reconnected by replacing the bolt 44 or pin 90 and the valve 81 is adjusted by moving its handle 82 to a power-down mode. Subsequent operation of the pump handle 87 will move the frames 35 and 42 away from each other. The insulator string 40 thus will resume its support of the suspension bracket, and the temporary connector device 34 is then removed. The cable 12 then may be moved from its broken line position 12a and connected in its final position of FIG. 4 to the suspension bracket 25 by the clamp 36.

As will be readily apparent to those skilled in the art, the present invention is not restricted to the stringing of a bundle of cables from a suspension bracket or yoke plate suspended by only two insulator strings. On the contrary, the invention may, for example, be employed with a suspension bracket suspended, for example, by two pairs of insulator strings in V-array, i.e. with two insulator strings disposed parallel to one another and spaced apart in the longitudinal direction of the cables at each side of the suspension bracket. In this case, a pair of temporary connecting tools such as the tool 35 are employed to enable the two insulator strings at one side of the suspension bracket to be uncoupled for passage of a cable upwardly therethrough.

Furthermore, while the above-described preferred embodiment of the invention makes use of the tool 34 to provide a temporary connection between one of the insulators of the string 40 and the suspension bracket 25, it is alternatively possible, for example, to employ a modification of the tool 34 to provide a temporary connection between two of the insulators of the string 40 or between one of the insulators and a suitable link included in the string 40 or between the tower crossarm and one of the insulators or the suspension bracket 25.

While the above-described suspension bracket 25 is designed to support only one cable, namely the cable 12, on the top of the suspension bracket between the insulator strings, the invention can also be employed to pass a plurality of cables through one or more insulator strings in cases where the suspension bracket is designed to suspend more than three cables with more than one cable between the insulato r strings at opposite sides of the suspension bracket.

We claim:

1. In a method of stringing a bundle of sub-conductors from a suspension bracket suspended by insulator strings each extending from a supporting structure to a suspension bracket, the improvement comprising the steps of;

securing a temporary connector device along at least a part of one of said insulator strings to provide a temporary suspension connection through a portion of said one insulator string and said temporary connector device;

disconnecting said one insulator string to provide a gap for passage of one of said sub-conductors, said temporary connector device serving to maintain a said temporary suspension connection across said gap;

raising said one of said conductors through said gap past said one insulator string;

reconnecting said one insulator string to close said gap;

removing said temporary connector device; and securing said one conductor to said suspension bracket.

2. A method of stringing conductors as claimed in claim 1, which includes actuating said temporary connector device, after the securing thereof, to take up tension in said one insulator string and thereby facilitate the disconnection of said one insulator string.

3. A method of stringing conductors as claimed in claim 1, in which the step of securing said temporary connector device comprises securing said temporary connector device to said one insulator string at an upper securement point and to said suspension bracket at a lower securement point which is aligned with the longitudinal axis of said one insulator string.

4. A method of stringing conductors as claimed in claim 3, which includes actuating said temporary connector device, after the securing thereof, to take up tension in said portion of said one insulator string between said upper and lower securement points and thereby facilitate the disconnection of said one insulator string.

5. A method of stringing conductors as claimed in claim 3, in which the securing of said temporary connector device to said one insulator string at said upper securement point is effected by clamping engagement of a part of said temporary connector device around an insulator forming part of said one insulator string.

6. A method of stringing conductors as claimed in claim 3, which includes inserting a pin through said suspension bracket and said temporary connector device to secure the latter to the former at said lower connection point.

7. A method of clipping in an electrical conductor to a suspension bracket suspended by insulator assemblies from a support, said method comprising the steps of:

temporarily suspending said conductor near said suspension bracket;

positioning a temporary connector device along a lower portion of one of said insulator assemblies;

securing a lower end of said temporary connector device to said suspension bracket;

securing an upper end of said temporary connector device to an insulator forming part of said one insulator assembly;

effecting relative displacement of said upper and lower ends of said temporary connector device towards one another to release tension in said one insulator assembly therebetween, whereby said temporary connector suspends said suspension bracket from said insulator;

uncoupling said one insulator assembly to provide a gap therein between said upper and lower ends of said temporary connector;

raising said conductor through said gap;

recoupling said one insulator assembly to close said gap;

releasing and removing said temporary connector device from said suspension bracket and said one insulator assembly, whereby said suspension bracket is again suspended by said one insulator assembly; and clamping said conductor to said suspension bracket.

8. A method as claimed in claim 7, which includes effecting said relative displacement by supplying hydraulic fluid under pressure to a piston and cylinder device connection between said upper and lower ends of said temporary connector device.

9. A method as claimed in claim 7, which includes positioning said temporary connector device above said one insulator prior to and during the securing of said upper and lower ends to said insulator and said suspension bracket, respectively, whereby said conductor is received between said temporary connector device and said one insulator assembly upon the recoupling of the latter.

10. In a method of stringing conductors from a suspension bracket suspended by insulator string from a supporting structure, the improvement comprising the steps of:

providing a temporary suspension connection between said supporting structure and said suspension bracket adjacent one of said insulato r strings;

releasing tension in said one insulator string to allow disconnection of said one insulator string while said temporary suspension connection maintains the suspension of said suspension bracket;

raising one of said conductors past said disconnected insulator string;

reconnecting said string; and removing said temporary suspension connection.

11. A method of stringing conductors as claimed in claim 10, which includes contracting said temporary suspension connection to slacken said one insulator string between opposite ends of said temporary suspension connection and thereby facilitate the disconnection of said one insulator string.

12. A method of stringing conductors as claimed in claim 10, in which said temporary suspension connection extends from a point on said suspension bracket aligned with said one insulator string to an insulator intermediate the ends of said one insulator string.

13. A method as claimed in claim 12, which includes providing as said temporary suspension connection a generally C-shaped device which is resistant to bending, and securing the free ends of said C-shaped device to said suspension bracket and said insulator, respectively.

14. A method as claimed in claim 13, which includes temporarily holding said one conductor above said suspension bracket during the reconnection of said string and the removal of said temporary suspension connection.

* * * * *